(12) United States Patent
Elluru et al.

(10) Patent No.: US 12,207,185 B2
(45) Date of Patent: *Jan. 21, 2025

(54) SELECTING PLMN IN WIRELESS COMMUNICATION SYSTEM

(71) Applicant: Samsung Electronics Co., Ltd., Suwon-si (KR)

(72) Inventors: Seshadri Elluru, Bengaluru (IN); Prasad Basavaraj Dandra, Bangalore (IN); Vijay Ganesh Surisetty, Bangalore (IN); Rajdeep Kaur, Bengaluru (IN); Sameer Kumar Mandal, Bengaluru (IN); Siddhi Chandrashekhar Mayekar, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,917

(22) Filed: Feb. 21, 2024

(65) Prior Publication Data

US 2024/0196317 A1 Jun. 13, 2024

Related U.S. Application Data

(63) Continuation of application No. 18/307,318, filed on Apr. 26, 2023, now Pat. No. 11,943,708, which is a
(Continued)

(30) Foreign Application Priority Data

Mar. 30, 2021 (IN) .............................. 202141014501

(51) Int. Cl.
*H04W 48/18* (2009.01)
*H04W 48/16* (2009.01)
(Continued)

(52) U.S. Cl.
CPC .......... *H04W 48/18* (2013.01); *H04W 48/16* (2013.01); *H04W 60/04* (2013.01); *H04W 84/042* (2013.01)

(58) Field of Classification Search
CPC ..... H04W 48/18; H04W 48/16; H04W 60/04; H04W 84/042; H04W 8/06; H04W 8/082
See application file for complete search history.

(56) References Cited

U.S. PATENT DOCUMENTS

| 1,194,708 A * | 8/1916 | Buckwalter | E05C 17/32 |
| | | | 217/60 E |
| 8,463,269 B2 * | 6/2013 | Mubarek | H04W 48/18 |
| | | | 455/435.2 |

(Continued)

FOREIGN PATENT DOCUMENTS

EP 2959699 A1 12/2015

OTHER PUBLICATIONS

Office Action dated Sep. 13, 2022 for corresponding U.S. Appl. No. 17/344,462.
(Continued)

*Primary Examiner* — Julio R Perez
(74) *Attorney, Agent, or Firm* — Harness, Dickey & Pierce, P.L.C.

(57) ABSTRACT

A method for selecting a Public Land Mobile Network (PLMN) in a wireless communication system by a User Equipment (UE), the method includes detecting, by the UE, that the UE is operating in an interworking mode, triggering, by the UE, a manual scan in the interworking mode for acquiring a list of PLMNs in the wireless communication system, and causing, by the UE, a display to output the list of PLMNs in response to the triggering.

20 Claims, 6 Drawing Sheets

Related U.S. Application Data continuation of application No. 17/344,462, filed on Jun. 10, 2021, now Pat. No. 11,671,908.

(51) Int. Cl.
*H04W 60/04* (2009.01)
*H04W 84/04* (2009.01)

(56) References Cited

U.S. PATENT DOCUMENTS

| | | | | |
|---|---|---|---|---|
| 8,543,109 B2* | 9/2013 | Kim | .................... | H04W 60/005 |
| | | | | 455/435.1 |
| 8,731,552 B2* | 5/2014 | Hind | .................... | H04W 48/18 |
| | | | | 455/433 |
| 9,319,863 B2* | 4/2016 | Peruru | .................. | H04W 8/005 |
| 9,826,472 B2* | 11/2017 | Basavaraj | ............. | H04W 48/18 |
| 11,395,219 B2* | 7/2022 | Sen | ....................... | H04W 48/18 |
| 11,671,908 B2* | 6/2023 | Elluru | .................... | H04W 48/16 |
| | | | | 370/329 |
| 11,943,708 B2* | 3/2024 | Elluru | .................... | H04W 48/16 |
| 2007/0208584 A1* | 9/2007 | Kern | .................. | G06Q 30/0601 |
| | | | | 705/26.1 |
| 2008/0096559 A1* | 4/2008 | Phillips | .................. | H04W 48/18 |
| | | | | 455/435.2 |
| 2018/0132125 A1* | 5/2018 | Li | ......................... | H04W 24/10 |
| 2020/0374715 A1* | 11/2020 | Wang | ............... | H04W 36/00835 |
| 2021/0352608 A1* | 11/2021 | Chun | .................... | H04M 1/724 |
| 2022/0022122 A1* | 1/2022 | Cao | ........................ | H04W 60/04 |
| 2022/0240213 A1* | 7/2022 | Ly | .......................... | H04W 60/04 |
| 2023/0388775 A1* | 11/2023 | Prakasam | ............... | H04W 8/20 |
| 2024/0007939 A1* | 1/2024 | Neubacher | ............ | H04W 48/18 |

OTHER PUBLICATIONS

Notice of Allowance dated Jan. 26, 2023 for corresponding U.S. Appl. No. 17/344,462.

Notice of Allowance, dated Nov. 21, 2023, issued in U.S. Appl. No. 18/307,318.

* cited by examiner

SELECTING PLMN IN WIRELESS COMMUNICATION SYSTEM

CROSS-REFERENCE TO RELATED APPLICATION

This application is a continuation of U.S. application Ser. No. 18/307,318, filed Apr. 26, 2023, which is a continuation of U.S. application Ser. No. 17/344,462, filed on Jun. 10, 2021, which claims priority to Indian Patent Application No. 202141014501, filed on Mar. 30, 2021, in the Indian Intellectual Property Office, the disclosures of each of which are incorporated herein in their entirety by reference.

FIELD OF INVENTION

The present disclosure relates to a wireless communication system, and more specifically related to a method for selecting a Public Land Mobile Network (PLMN) in the wireless communication system comprising a Global System for Mobile (GSM) network, a Code Division Multiple Access (CDMA) network and a User Equipment (UE).

BACKGROUND

A manual scan or manual selection is currently supported only in a $3^{rd}$ Generation Partnership Project (3GPP) mode of operation. 3GPP 2 (3GPP2) technology does not support manual scan or manual selection.

The 3GPP Standard 23.122 describes manual PLMN scan and selection in Sections 2 & 3.1. For example, when a mobile station (MS) is switched on, the MS attempts to make contact with a Public Land Mobile Network (PLMN). The particular PLMN to be contacted may be selected either automatically or manually. If the MS loses coverage of the PLMN, either a new PLMN is selected automatically, or an indication of which PLMNs are available is given to the user so that a manual selection may be made. In a manual mode, the MS indicates to the user which PLMNs are available. Only when the user makes a manual selection does the MS attempt to obtain normal service on a Visited PLMN (VPLMN). Further, the PLMN is removed from a "forbidden PLMNs" list if, after a subsequent manual selection of that PLMN there is a successful Location Registration (LR), or upon expiry of timer T3245 if the MS is configured to use timer T3245.

In automatic mode, a UE may perform a Global Mode System Selection (GMSS) process. For example, a UE powered ON in a global mode acquires and updates an operating Mobile Country Code (MCC). A MMSS System Priority List (MSPL) table (as shown in the table 1) is derived from a Multi-Mode System Selection (MMSS) Location Associated Priority List (MLPL) table based on a MCC identifier. The current record index is then reset and system selection started. The current record index is incremented and a next system for registration is selected. If the UE determines that registration is unsuccessful, a determination is made as to whether the MSPL table is exhausted. If the MSPL table is not exhausted, then the current record is incremented and a next system for registration is selected. If the MSPL table is exhausted, then MSPL exhaustion timer is started, the current record index is reset and system selection started.

TABLE 1

| Index | SYSTEM | PREF CLASS |
|---|---|---|
| 0 | MSPL_EUTRAN_LTE | HOME |
| 1 | MSPL_CDMA2000_HRPD | HOME |
| 2 | MSPL_EUTRAN_LTE | PREF |
| 3 | MSPL_UTRAN_UMTS | PREF |
| 4 | MSPL_CDMA2000_HRPD | ANY |
| 5 | MSPL_SYS3GPP_AI | PREF |

TABLE 2

| Preferred class | 3GPP SIM Preferred list |
|---|---|
| HOME | HOME PLMN list (EHPLMN list/Home PLMN from International Mobile Subscriber Identity (IMSI)) |
| PREF | OPERATOR PLMN List |
| ANY | Any available PLMNs including random PLMNs |

The preferred class matching for 3GPP access technologies indicated in table 2.

TABLE 3

| Preferred class | 3GPP2 Preferred list |
|---|---|
| HOME | Highest priority derived from priority (PRI) in Preferred Roaming List (PRL) System Record. |
| PREF | Second priority derived from PRI in PRL System Record. |
| ANY | From third priority derived from PRI in PRL System Record. |

For CDMA entries, the preferred classes map is indicated in table 3.

SUMMARY

As explained in the above, when the UE is operating in the global mode (e.g., 3GPP and 3GPP2 interworking mode) no methodology exists for manual scan/selection in various scenarios.

Scenario 1: The user of the UE is in border area of a home and roaming network availability with the UE operating in the global mode. As the global mode does not have manual scan/selection, the UE may move from the home to roam network or vice versa. There is no provision in the global mode if the user wants to restrict camping to that only on the home network. Due to this restriction user may register on roaming network which lead to roaming charges and also to losing home network services.

Scenario 2: The user of the UE is in area where only PLMN B is available, but PLMN B is in a forbidden PLMN (FPLMN) List in a Subscriber Identity Module (SIM) of the UE. In an automatic mode, as PLMN B is Forbidden, the UE is unable to attempt registration for normal service. As there is no manual scan/selection in the global mode, the user may not be able to register to PLMN B.

Scenario 3: The GMSS works based on an MSPL table configured by an operator. Consider that a user is registered on CDMA 1× Home without Long-Term Evolution (LTE)/High-Rate Packet Data (HRPD) Home networks available, 1× will be used for both Circuit Switching (CS) and Packet Switching (PS) (low data throughput) and in the same area or a similar area there are other partner LTE networks available which provide better data rates that will not be selected automatically as per GMSS algorithm. There is no option for a user to manually select the available partner LTE network.

Thus, it is desired to address the above mentioned disadvantages or other shortcomings, or at least provide a useful alternative.

Embodiments herein provide a method for selecting a PLMN in a wireless communication system including a GSM network, a CDMA network and a UE.

Embodiments herein provide for detection that the UE is operating in an interworking mode.

Embodiments herein provide triggering of a manual scan in the interworking mode for acquiring a list of available GSM network based PLMNs in the wireless communication system.

Embodiments herein provide for display of the list of available GSM network based PLMNs in response to triggering the manual scan in the interworking mode.

Embodiments herein provide for selection of at least one PLMN from the displayed list of available GSM network based PLMNs by a user of the UE.

Embodiments herein provide for registration of the UE with the at least one selected PLMN from the displayed list of available GSM network based PLMNs based on the selection.

Embodiments herein provide for determination of whether to attempt registration on a CDMA network of corresponding the GSM PLMN network or corresponding to the preferred network class selected by a user based on registration result from the GSM PLMN network.

Accordingly, embodiments herein provide a method for selecting a Public Land Mobile Network (PLMN) in a wireless communication system by a User Equipment (UE). The method includes detecting, by the UE, that the UE is operating in an interworking mode, triggering, by the UE, a manual scan in the interworking mode for acquiring a list of PLMNs in the wireless communication system, and causing, by the UE, a display to output the list of PLMNs in response to the triggering.

In embodiments, further, the method includes receiving, by the UE, a first selection of at least one PLMN among the list of PLMNs from an external source or a second selection of a selected network class from the external source, and registering the UE with a selected PLMN among the list of PLMNs based on the first selection or the second selection.

In embodiments, the method includes the selected PLMN is one of included in the at least one PLMN based on the receiving including receiving the first selection, a PLMN equal to the at least one PLMN based on the receiving including receiving the first selection, included in the selected network class based on the receiving including receiving the second selection, or a PLMN equal to the selected network class based on the receiving including receiving the second selection, and the method further comprises determining whether to attempt registration on a Code Division Multiple Access (CDMA) network corresponding to the at least one PLMN or a CDMA network corresponding to the selected network class based on a registration result from the selected PLMN.

In embodiments, further, the method includes determining, by the UE, that the selected PLMN is a low priority PLMN, starting, by the UE, a timer based on the determining the selected PLMN is the low priority PLMN, detecting, by the UE, that the timer is expired, scanning, by the UE, a high priority system corresponding to the selected network class, determining, by the UE, whether the high priority system is available based on the scanning, and performing, by the UE, one of attempting to register on the high priority system in response to determining the high priority system is available, or restarting the timer in response to determining the high priority system is not available.

In embodiments, the interworking mode is a 3$^{rd}$ Generation Partnership Project (3GPP) and 3GPP2 interworking mode. In embodiments, each PLMN in the list of PLMNs corresponds to a Global System for Mobile (GSM) network-based PLMN.

In embodiments, the method includes determining the high priority system is determined based on the receiving the first selection or the second selection. In embodiments, the method includes determining the low priority PLMN based on the selected network class and a SIM card priority list. In embodiments, the detecting of the method detects that the UE is operating in the interworking mode based on a usage of a SIM card. In embodiments, the method includes registering the UE with a selected PLMN among the list of PLMNs. In embodiments, the method includes performing wireless communication with the selected PLMN based on the registering.

Embodiments herein provide a UE for selecting a Public Land Mobile Network (PLMN) in a wireless communication system. The UE includes a display, and processing circuitry configured to detect that the UE is operating in an interworking mode, trigger a manual scan in the interworking mode for acquiring a list of PLMNs in the wireless communication system, and cause the display to output the list of PLMNs in response to triggering the manual scan.

Embodiments herein provide a non-transitory computer-readable medium storing instructions that, when executed by processing circuitry, cause the processing circuitry to perform a method for selecting a Public Land Mobile Network (PLMN) in a wireless communication system by a User Equipment (UE). The method includes detecting, by the UE, that the UE is operating in an interworking mode, triggering, by the UE, a manual scan in the interworking mode for acquiring a list of PLMNs in the wireless communication system, and causing, by the UE, a display to output the list of PLMNs in response to the triggering.

These and other aspects of embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of embodiments herein without departing from the spirit thereof, and embodiments herein include all such modifications.

BRIEF DESCRIPTION OF FIGURES

This method and UE are illustrated in the accompanying drawings, throughout which like reference letters indicate corresponding parts in the various figures. Embodiments herein will be better understood from the following description with reference to the drawings, in which.

DETAILED DESCRIPTION

Figure 1A:
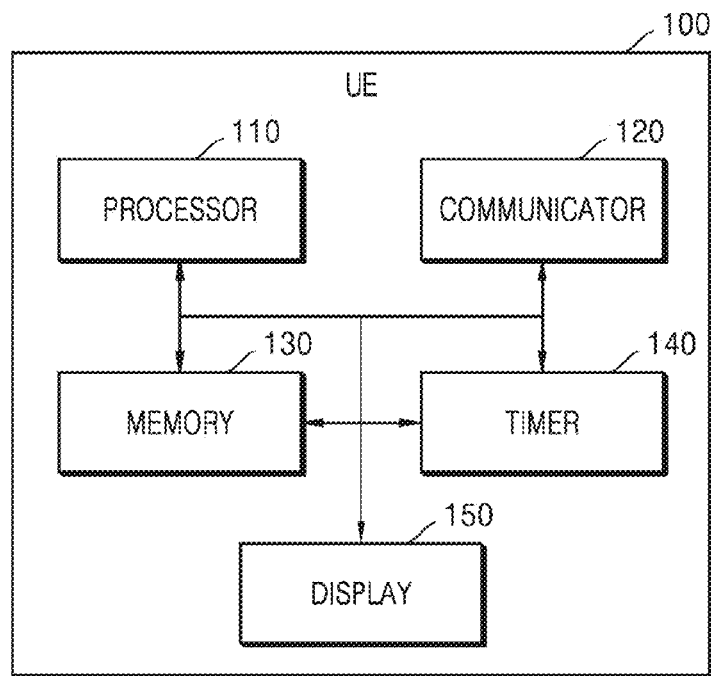
FIG. 1A shows various hardware components of a UE for selecting a PLMN in a wireless communication system comprising a GSM network, a CDMA network and the UE, according to embodiments as disclosed herein.

Embodiments herein and the various features and advantageous details thereof are explained more fully with reference to non-limiting embodiments that are illustrated in the accompanying drawings and detailed in the following description. Descriptions of well-known components and processing techniques are omitted so as to not obscure embodiments herein. Also, embodiments described herein are not mutually exclusive, as embodiments can be combined to form new embodiments. The term "or" as used herein, refers to a non-exclusive or, unless otherwise indicated. The examples used herein are intended merely to facilitate an understanding of ways in which embodiments herein can be practiced and to further enable those skilled in the art to practice embodiments herein. Accordingly, the examples should not be construed as limiting the scope of embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of embodiments. Likewise, the blocks may be physically combined into more complex blocks without departing from the scope of embodiments.

The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

As used herein, the term "preferred" refers to a selection, an order of priority, etc., and should not be interpreted as a preference for particular embodiments.

Accordingly, embodiments herein achieve a method for selecting a public land mobile network (PLMN) in a wireless communication system comprising a Global System for Mobile (GSM) network, a Code Division Multiple Access (CDMA) network and a User Equipment (UE). The method includes detecting, by the UE, that the UE is operating in an interworking mode. Further, the method includes triggering, by the UE, a manual scan in the interworking mode for acquiring a list of available GSM network based PLMNs in the wireless communication system. Furthermore, the method includes causing to display, by the UE, the list of available GSM network based PLMNs in response to triggering the manual scan in the interworking mode.

Referring now to the drawings, and more particularly to FIGS. 1A through 4, there are shown embodiments.

FIG. 1A shows various hardware components of a UE (100) for selecting a PLMN in a wireless communication system comprising a GSM network, a CDMA network and the UE (100), according to embodiments as disclosed herein. The UE (100) may be, for example, but is not limited to a cellular phone, a smart phone, a Personal Digital Assistant (PDA), a wireless modem, a tablet computer, a laptop computer, an Internet of Things (IoT) or the like.

In embodiments, the UE (100) comprises a processor (110), a communicator (120), a memory (130), a timer (140), and/or a display (150). The processor (110) may be coupled with the communicator (120), the memory (130), the timer (140), and/or the display (150). The timer may be a Manual high priority service recovery (MHPSR) timer. The value of the timer (140) may be implementation dependent.

The processor (110) may be configured to detect whether the UE (100) is operating in an interworking mode. The interworking mode may be a $3^{rd}$ Generation Partnership Project (3GPP) and 3GPP2 interworking mode which is defined in 3GPP 23.122. In an example, based on a SIM card used, the processor (110) may determine whether the UE (100) may operate in the interworking mode or not. According to embodiments, the processor (110) may detect whether the UE (100) is operating in the interworking mode based on the SIM card being used.

According to embodiments, the processor (110) may be configured to detect whether the UE (100) is operating in the interworking mode using data at, or obtainable by, the UE (100) using methods and/or implementations that would be known to a person of ordinary skill in the art. The UE (100) may support access technologies (e.g., Radio Access Technologies) defined both by 3GPP and 3GPP2 and may consider all supported access technologies in all supported bands when performing PLMN selection. During the PLMN selection process, the UE (100) may find the highest priority PLMN and to attempt to register to it. The UE (100) may follow PLMN selection procedures across both 3GPP and 3GPP2 access technologies based on the methods described herein.

Further, the processor (110) may be configured to trigger a manual scan in the interworking mode for acquiring a list of available GSM network based PLMNs (also referred to as GSM network-based PLMNs herein) in the wireless communication system. In embodiments, the processor (110) may be configured to perform the manual scan in the interworking mode for acquiring the list of available GSM network based PLMNs. After triggering the manual scan in the interworking mode, the processor (110) may be configured to display (e.g., output) the list of available GSM network based PLMNs on the display (150). In embodiments, the processor (110) may be configured to display the list of available GSM network based PLMNs on the display (150) grouped according to network class PLMN.

Further, the processor (110) may be configured to receive a selection of at least one PLMN from the displayed list of available GSM network based PLMNs by a user of the UE (100). In embodiments, the processor (110) may be configured to receive a selection of a preferred network class (e.g., from the displayed list of available GSM network based PLMNs) by the user of the UE (100). Based on the selection(s), the processor (110) may be configured to determine whether the UE (100) is to be registered with a selected PLMN based on one of the user selection of the at least one PLMN and/or a user selected preferred network class PLMN (also referred to herein as a selected network class and/or a preferred network class). In response to determining that the UE (100) is to be registered with the selected PLMN based on the user selection, the processor (110) may be configured to perform the UE selection on the user selected PLMN, or a PLMN equal or similar to the user selected PLMN.

In an example, the network class is derived for a particular PLMN based on a below configuration in a SIM card.

| Preferred class | 3GPP SIM Preferred list |
| --- | --- |
| HOME | HOME PLMN list (EHPLMN list/Home PLMN from IMSI) |
| PREF | OPERATOR PLMN List |
| ANY | Any available PLMNs including random PLMNs |

Consider an example of an Operator PLMN list (PREF Network class) configured as below:
1) PLMN A
2) PLMN B
3) PLMN C If the user of the UE (100) selects PREF network class option in the manual selection then, the processor (110) may select and attempt registration on any of the above PLMN's in an operator PLMN list.

Scenario—1 (PREF Class is selected): Consider, the UE (100) registered on PLMN B after PREF class is selected. PLMN D and PLMN E may be Equivalent PLMNs (EPLMNS) with respect to PLMN B. As per the proposed method, the UE (100) may select EPLMN's (PLMN D, PLMN E) and/or also other Operator PLMN's (PLMN A and PLMN C) (e.g., in response to the user's selection of the PREF class option in the manual selection).

Scenario—2 (Single PLMN is selected): Consider, the UE (100) registered on PLMN B after manually selecting PLMN B. PLMN D and PLMN E may be Equivalent PLMNs with respect to PLMN B. As per the proposed method, the UE (100) may select only EPLMN's (PLMN D, PLMN E) (e.g., in response to the user's selection of the PLMN B in the manual selection). The UE (100) may be prevented from, or limited with regards to, attempting registration on other Operator PLMN's (PLMN A and PLMN C) (e.g., by the processor (110)) because the user of the UE (100) did not select PREF class option.

In embodiments, the processor (110) determines a PLMN equal or similar to the user selected PLMN with reference to a 3GPP SIM Preferred list or a 3GPP2 Preferred list, with PLMNs included in a same class being equal or similar. In response to determining that the UE (100) is to be registered with the selected PLMN based on the user selected preferred network class PLMN, the processor (110) may be configured to perform the UE selection on the user selected preferred network class PLMN, or a PLMN equal or similar to the user selected preferred network class PLMN. In embodiments, the processor (110) determines a PLMN equal or similar to the user selected preferred network class PLMN with reference to a 3GPP SIM Preferred list or a 3GPP2 Preferred list, with PLMNs included in the selected network class being equal or similar to the selected network class. Based on a registration result from the GSM PLMN (e.g., the selected PLMN), the processor (110) may be configured to determine whether to attempt registration on the CDMA network of a corresponding GSM PLMN network (e.g., the user selected PLMN) or a network corresponding to the preferred network class selected by the user. In an example, if the 3GPP system does not support voice services (based on registration result) then, the UE (100) may determine to attempt registration on the CDMA network. In embodiments, the processor (110) may be configured to attempt registration with the selected PLMN and, after the processor (110) successfully registers with the selected PLMN, the processor (110) may be configured to perform wireless communication (e.g., transmit and/or receive data) with and/or via the selected PLMN.

Further, the processor (110) may be configured to determine the selected PLMN is a low priority PLMN and start the timer (140) based on the determination. The processor (110) may determine the low priority PLMN based on a network class and/or a SIM card priority list. In embodiments, the processor (110) may be configured to determine that the selected PLMN is a low priority PLMN with reference to a 3GPP SIM Preferred list or a 3GPP2 Preferred list, with PLMNs included in at least one of the ANY class and/or the Preferred class being low priority PLMNs. In embodiments, PLMNs included in a network class of lower priority than the selected network class may be low priority PLMNs. Further, the processor (110) may be configured to detect that the timer (140) is expired and scan a high priority system corresponding to the user selected network class based on the timer expiry. The high priority system may be a better system as per an MSPL/MLPL configuration. MSPL/MLPL is discussed further above. In an example, as per Table 1, if the UE (100) is registered on a Universal Mobile Telecommunication Service (UMTS) Operator PLMN (OPLMN) (PREF class) network (e.g., record index 3), then, based on a scanning result UE (100) may move to the high priority system (e.g., record index 0, 1 or 2).

In embodiments, the high priority system may include at least one PLMN of the selected network class. Further, the processor (110) may be configured to determine whether the high priority system is available (e.g., available for registration by the processor (110)) in the wireless communication system based on the scanning. The processor (110) may determine the high priority system when at least one of the selected network class is received and/or the selected PLMN is received. In response to determining that the high priority system is available in the wireless communication system, the processor (110) may be configured to attempt to register on the high priority system in the wireless communication system. In response to determining that the high priority system is not available in the wireless communication system, the processor (110) may be configured to restart the timer (140).

The processor (110) may be configured to execute instructions stored in the memory (130) and to perform various processes. The communicator (120) may be configured for communicating internally between internal hardware components and/or with external devices via one or more networks.

Further, the memory (130) may store instructions to be executed by the processor (110). The memory (130) may include non-volatile storage elements. Examples of such non-volatile storage elements may include magnetic hard discs, optical discs, floppy discs, flash memories, and/or forms of electrically programmable memory (EPROM) or electrically erasable and programmable memory (EEPROM). In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) may be configured to store larger amounts of information than the memory (130). In certain examples, a non-transitory storage medium may store data that may, over time, change (e.g., in Random Access Memory (RAM) or cache).

Although the FIG. 1A shows various hardware components of the UE (100), it is to be understood that embodiments are not limited thereon. In embodiments, the UE (100) may include less or more components. Further, the labels or names of the components are used only for illustrative purposes and do not limit the scope of embodiments. One or more components may be combined together to perform the same or a substantially similar function to select the PLMN in the wireless communication system.

Figure 1B:
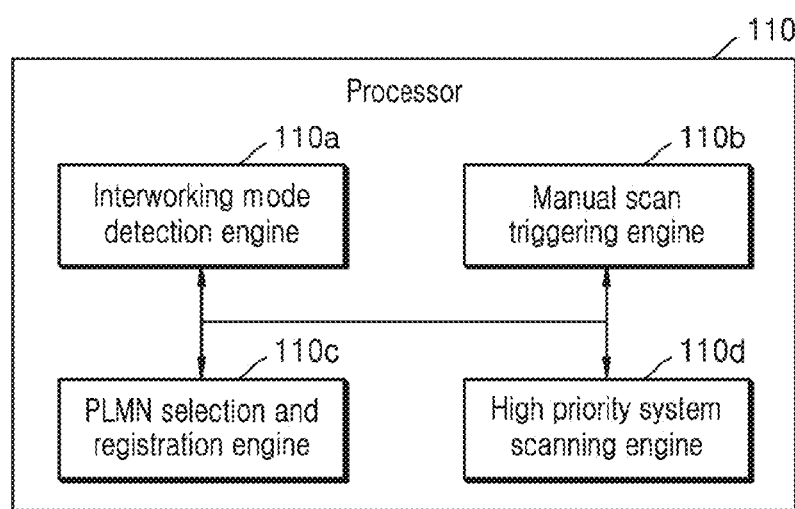
FIG. 1B shows various hardware components of a UE for selecting a PLMN in a wireless communication system comprising a GSM network, a CDMA network and the UE, according to embodiments as disclosed herein.

FIG. 1B shows various hardware components of the processor (110) included in the UE (100), according to embodiments as disclosed herein. In embodiments, the processor (110) includes an interworking mode detection engine (110a), a manual scan triggering engine (110b), a PLMN selection and registration engine (110c), and/or a high priority system scanning engine (110d).

The interworking mode detection engine (110a) may be configured to detect that the UE (100) is operating in an interworking mode. Further, the manual scan triggering engine (110b) may be configured to trigger the manual scan in the interworking mode for acquiring a list of available GSM network based PLMNs in the wireless communication system. After triggering the manual scan in the interworking mode, the PLMN selection and registration engine (110c) may be configured to display the list of available GSM network based PLMNs on the display (150).

Further, the PLMN selection and registration engine (110c) may be configured to select at least one PLMN from the displayed list of available GSM network based PLMNs by a user of the UE (100). In embodiments, the PLMN selection and registration engine (110c) may be configured to receive the selection from the user of the UE (100) of the at least one PLMN displayed in the list of available GSM network based PLMNs. Based on the selection, the PLMN selection and registration engine (110c) may be configured to determine whether the UE (100) is to be registered with the at least one PLMN based on one of the user selection and/or a user selected preferred network class PLMN. In response to determining that the UE (100) is to be registered with the at least one PLMN based on the user selection, the PLMN selection and registration engine (110c) may be configured to perform the UE selection on the user selected PLMN or a PLMN equal or similar to the user selected PLMN. In response to determining that the UE (100) is to be registered with the at least one PLMN based on the user selected preferred network class PLMN, the PLMN selection and registration engine (110c) may be configured to perform the UE selection on the user selected preferred network class PLMN or a PLMN equal or similar to the user selected preferred network class PLMN.

Further, the PLMN selection and registration engine (110c) may be configured to determine the at least one selected PLMN is a low priority PLMN and start the timer (140) based on the determination. Further, the PLMN selection and registration engine (110c) may be configured to detect that the timer (140) is expired and scan a high priority system corresponding to the user selected network class based on the timer expiry using the high priority system scanning engine (110d). Further, the PLMN selection and registration engine (110c) may be configured to determine whether the high priority system is available in the wireless communication system based on the scanning. In response to determining that the high priority system is available in the wireless communication system, the PLMN selection and registration engine (110c) may be configured to attempt to register on the high priority system in the wireless communication system. In response to determining that the high priority system is not available in the wireless communication system, the PLMN selection and registration engine (110c) may be configured to restart the timer (140).

Although the FIG. 1B shows various hardware components of the processor (110) but it is to be understood that embodiments are not limited thereon. In embodiments, the processor (110) may include less or more components. Further, the labels or names of the components are used only for illustrative purposes and do not limit the scope of embodiments. One or more components may be combined together to perform same or substantially similar function to select the PLMN in the wireless communication system.

Figure 2A:
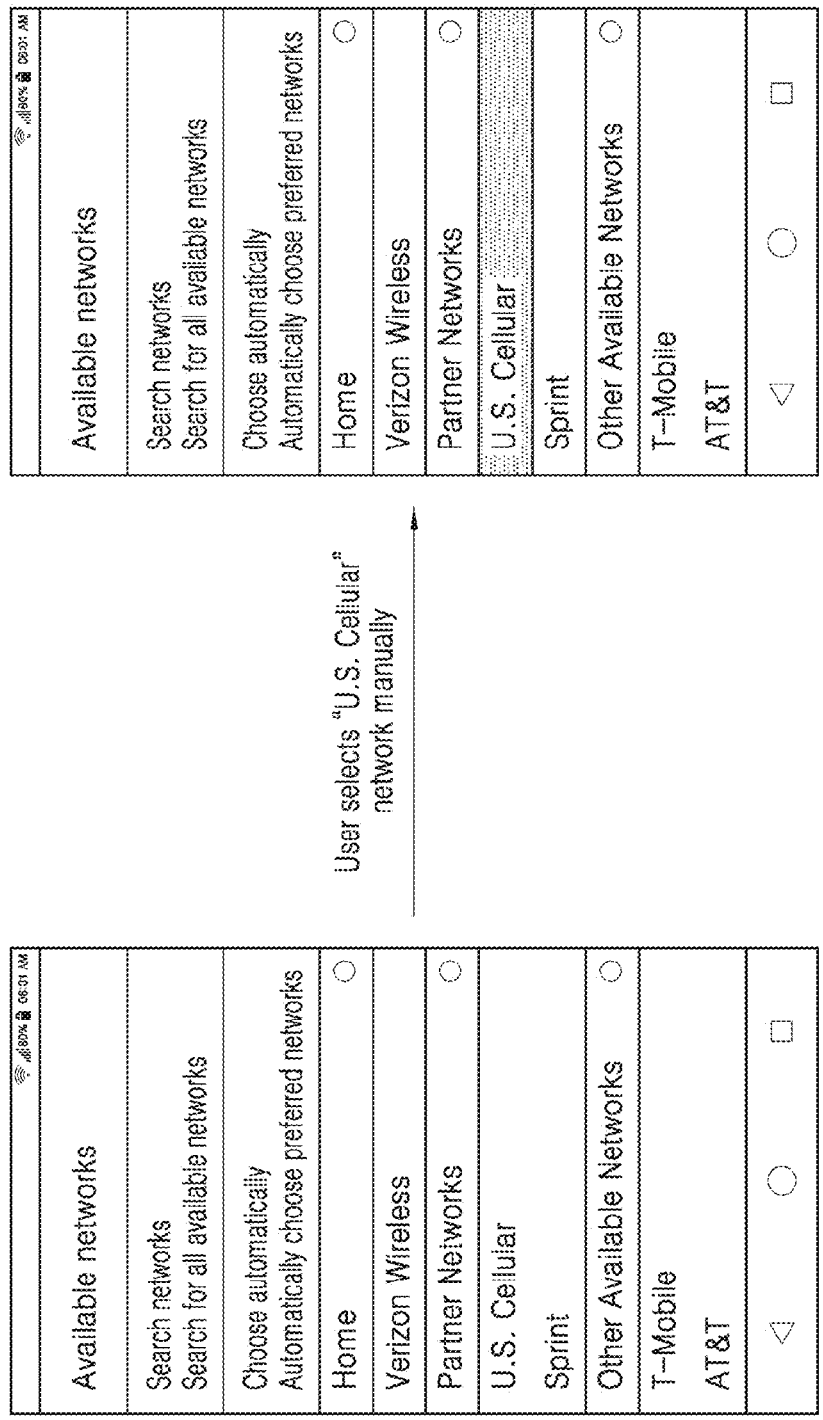
FIG. 2A is an example illustration in which a manual selection of a PLMN is depicted, according to embodiments as disclosed herein.

FIG. 2A is an example illustration in which a manual selection of a PLMN is depicted, according to embodiments as disclosed herein. Based on the proposed method, when the user selects a PLMN, the UE (100) will attempt registration on all the Radio Access Technologies (RAT's) (e.g., 3GPP and 3GPP2) that it is capable of (e.g., configured to register with).

Figure 2B:
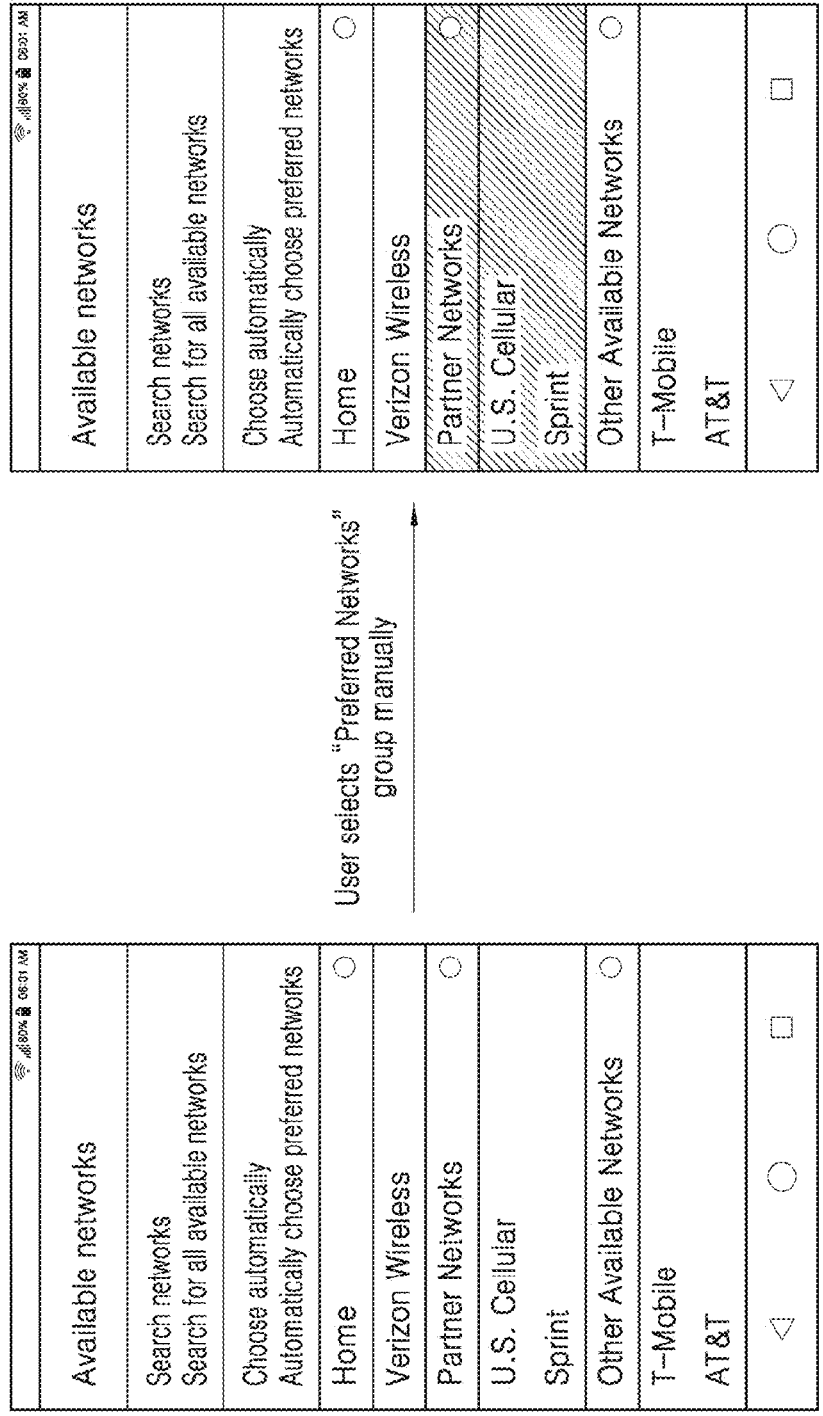
FIG. 2B is an example illustration in which a network class based manual selection is depicted, according to embodiments as disclosed herein.

FIG. 2B is an example illustration in which a network class based manual selection is depicted, according to embodiments as disclosed herein. Based on the proposed method, the are 3 types of network classes that may be categorised into:
  I. Home Class (depicted as "Home"): (E) Home PLMN (HPLMN),
  II. Preferred Class (depicted as "Partner Networks"): All PLMN's that (U)SIM card (Operator) has tie up with. These PLMN's are configured by operator in EF_OPLMNwACT file or EF_Selector PLMN List, and/or
  III. Any Class (depicted as "Other Available Networks"): All other PLMN's apart from above PLMN's.

When the user selects network class (e.g., selection of the Preferred Class as depicted), the UE (100) will attempt registration on all the networks that are configured for that class in all the RAT's (e.g., 3GPP and 3GPP2) that UE is capable of. The network class may be selected by the user. This is an additional option provided to the user as part of the proposed method over existing 3GPP standard defined selection of a PLMN from the list.

Figure 2C:
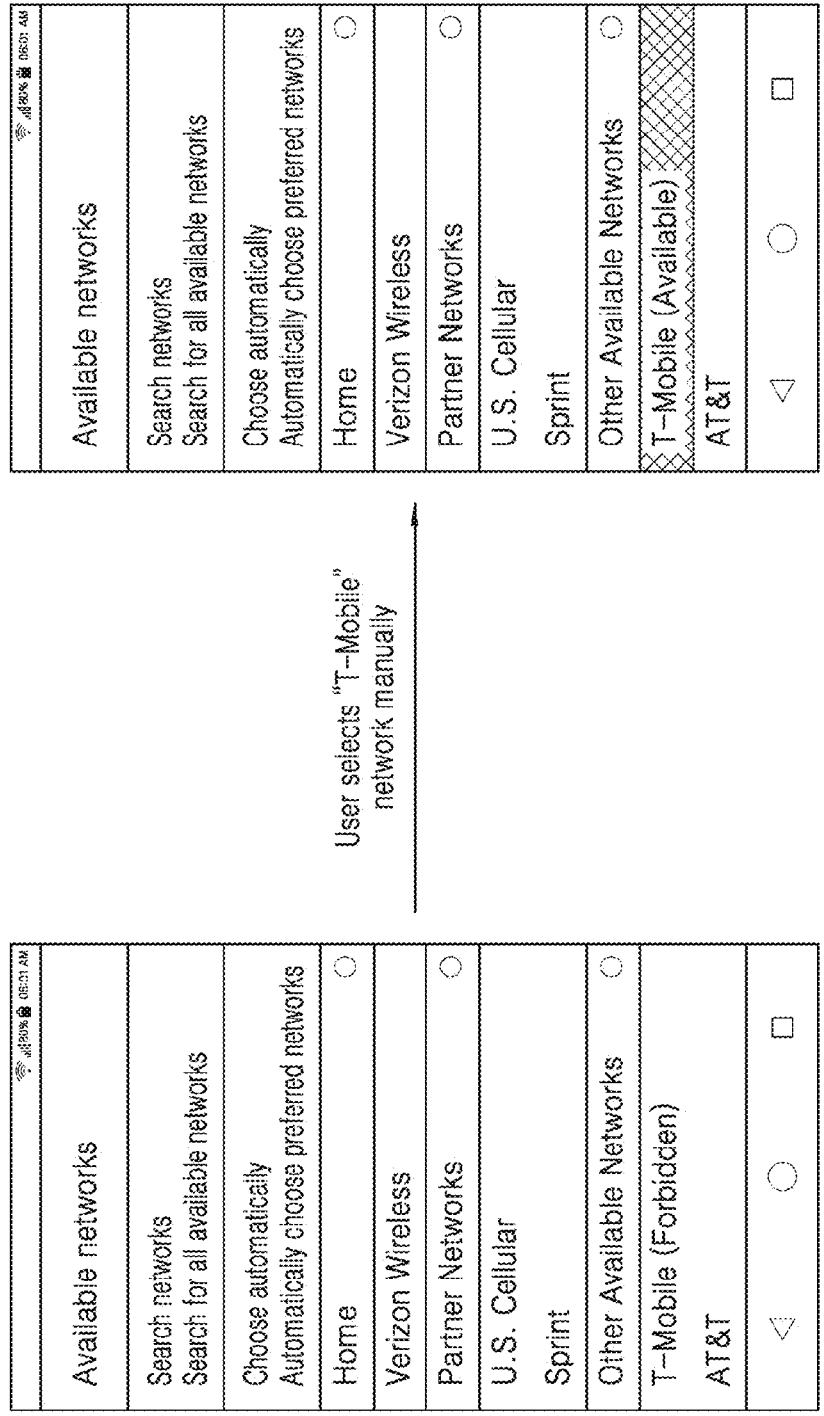
FIG. 2C is an example illustration in which manual selection of a FPLMN, according to embodiments as disclosed herein.

FIG. 2C is an example illustration in which manual selection of a Forbidden PLM (FPLMN), according to embodiments as disclosed herein. Based on the proposed method, the user has an option now to select FPLMN in Global mode. In embodiments, the FPLMN is removed from a "forbidden PLMNs" list if, after a subsequent manual selection of that FPLMN there is a successful registration thereto.

Figure 3A:
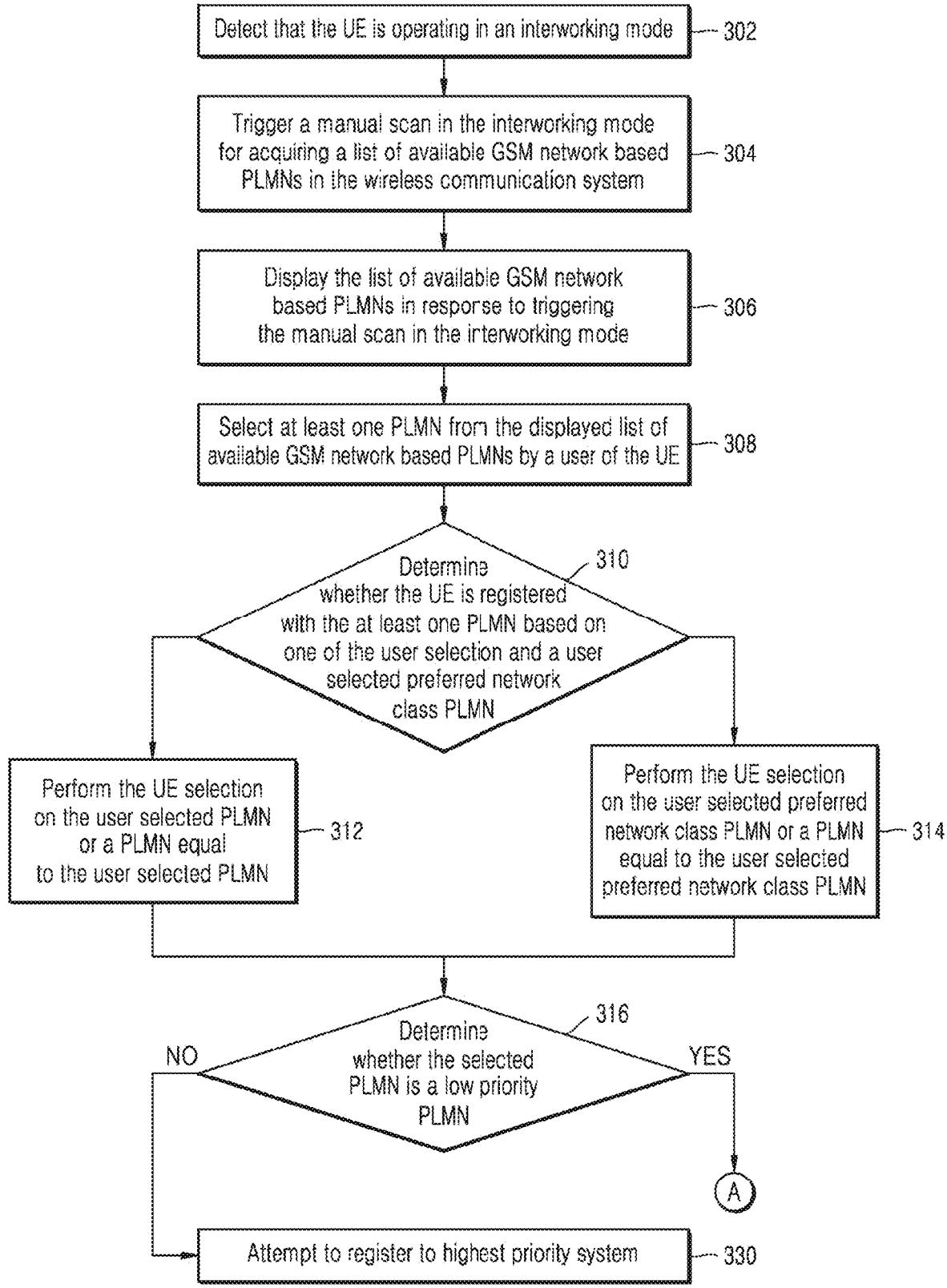
FIGS. 3A and 3B depict a flow diagram illustrating a method for selecting a PLMN in a wireless communication system comprising a GSM network, a CDMA network and the UE, according to embodiments as disclosed herein.
Figure 3B:
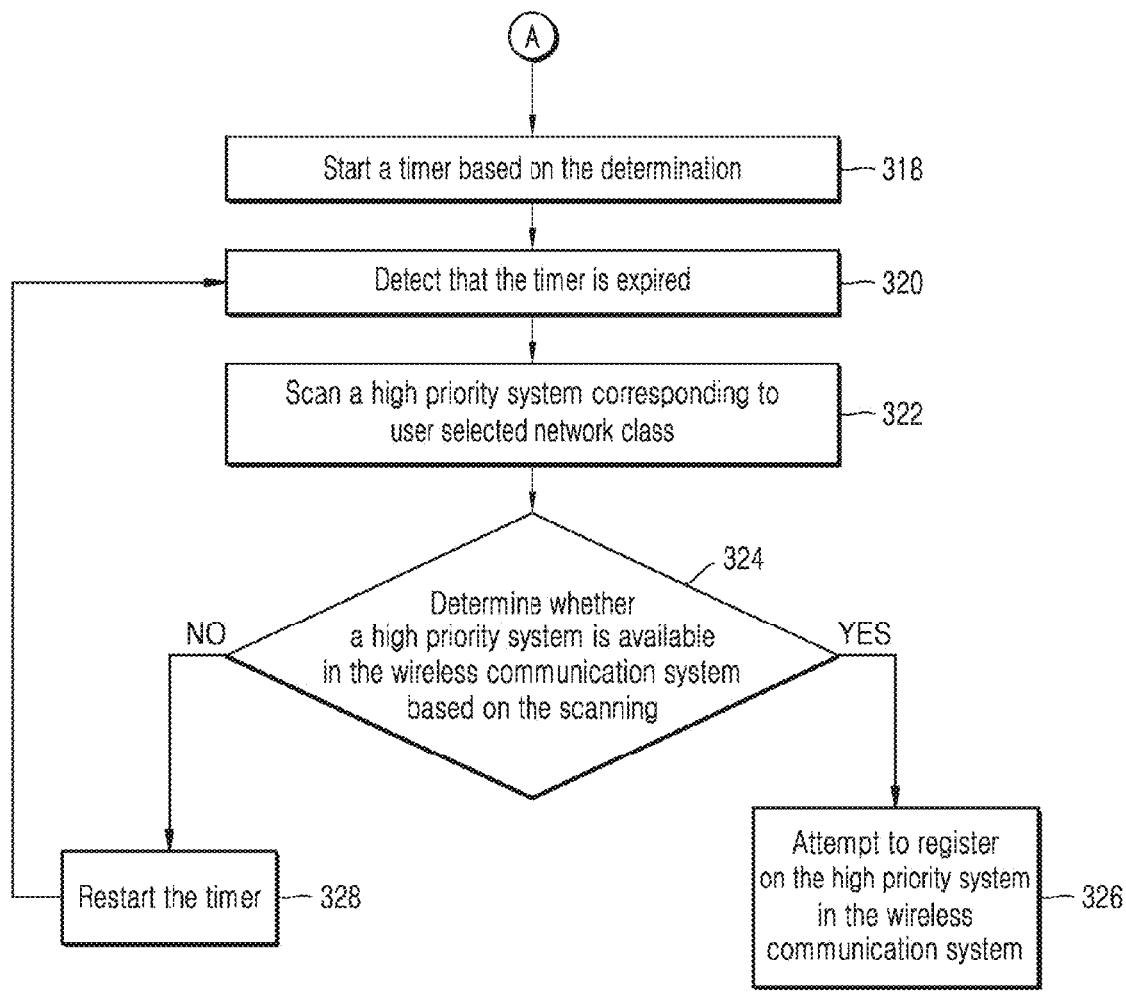

FIGS. 3A-3B depict a flow diagram (300) illustrating a method for selecting the PLMN in the wireless communication system including the GSM network, the CDMA network and the UE (100), according to embodiments as disclosed herein. The operations (302-330) may be performed by the processor (110).

At 302, the method includes detecting that the UE (100) is operating in the interworking mode. At 304, the method includes triggering the manual scan in the interworking mode for acquiring the list of available GSM network based PLMNs in the wireless communication system. At 306, the method includes causing to display the list of available GSM network based PLMNs in response to triggering the manual scan in the interworking mode.

At 308, the method includes selecting the at least one PLMN from the displayed list of available GSM network based PLMNs by the user of the UE (100). At 310, the method includes determining whether the UE (100) is to be registered with the at least one PLMN based on one of the user selection and/or the user selected preferred network class PLMN.

In response to determining that the UE is to be registered with the at least one PLMN based on the user selection then, at 312, the method includes performing the UE selection on the user selected PLMN, or a PLMN equal or similar to the user selected PLMN (e.g., an Equivalent PLMN (EPLMN)). In response to determining that the UE (100) is to be registered with the at least one PLMN based on the user selected preferred network class PLMN then, at 314, the method includes performing the UE selection on the user selected preferred network class PLMN, or the PLMN equal or similar to the user selected preferred network class PLMN (e.g., an EPLMN). Based on a registration result from the GSM PLMN network, the method includes determining whether to attempt registration on the CDMA network of corresponding GSM PLMN network or corresponding to the preferred network class selected by the user.

At 316, method includes determining whether the at least one selected PLMN is the low priority PLMN. If the at least one selected PLMN is the low priority PLMN then, at 318, the method includes starting the timer (140) based on the determination that the at least one selected PLMN is the low priority PLMN. At 320, the method includes detecting that the timer (140) is expired. At 322, the method includes scanning the high priority system corresponding to the user selected network class (e.g., same or similar MSPL entry, or a higher priority MSPL entry). At 324, the method includes determining whether the high priority system is available in the wireless communication system based on the scanning. In response to determining that the high priority system is available in the wireless communication system then, at 326, the method includes attempting to register on the high priority system in the wireless communication system. In response to determining that the high priority system is not available in the wireless communication system then, at 328, the method includes restarting the timer and returning to 320. If the at least one selected PLMN is not the low priority PLMN then, at 330, the method includes attempting to register to a high priority system (e.g., on the user selected PLMN or a PLMN equal or similar to the user selected PLMN).

Conventional methods and devices for performing wireless communication according to the 3GPP2 standard automatically select a PLMN for registration without providing a user with the opportunity to manually select the PLMN for registration. This lack of functionality results in, e.g., excessive roaming charges, an inability to register to a PLMN included on a FPLMN list, and low data throughput.

However, embodiments provide improved methods and devices that enable manual selection of PLMN for registration while operating under the 3GPP2 standard. In so doing, the improved methods and devices override the routine operations under the 3GPP2 standard to provide additional functionality in the form of a manual PLMN selection. Accordingly, the improved methods and devices overcome the deficiencies of the conventional methods and devices to prevent or reduce excessive roaming charges, enable registration to a PLMN included on a FPLMN list and/or improve data throughput.

The various actions, acts, blocks, operations, or the like in the flow diagram 300 may be performed in the order presented, in a different order, or simultaneously or contemporaneously. Further, in embodiments, some of the actions, acts, blocks, operations, or the like may be omitted, added, modified, skipped, or the like without departing from the scope of embodiments.

Figure 4:
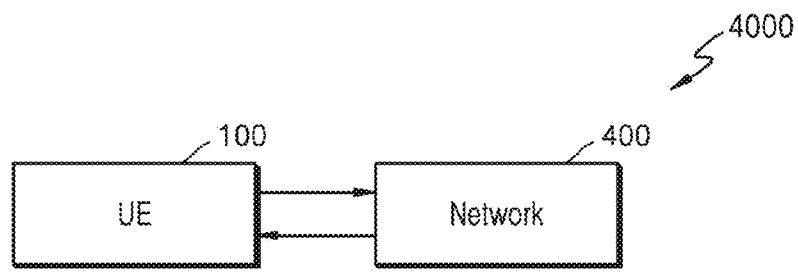
FIG. 4 shows an overview of the wireless communication system including the UE and a network, according to embodiments as disclosed herein.

FIG. 4 shows an overview of the wireless communication system (4000) including the UE (100) and a network (400), according to embodiments as disclosed herein. The network (400) may be, for example, but is not limited to the GSM network, the CDMA network, the LTE network, a new radio (NR) network and/or any other 3GPP network. The UE (100) may be configured to detect whether the UE (100) is operating in the interworking mode. In an example, based on the SIM card used, the UE (100) may determine whether the UE (100) may operate in the interworking mode or not. Further, the UE (100) may support radio access technologies defined both by 3GPP and 3GPP2 and may consider all supported access technologies in all supported bands when performing PLMN selection. During the PLMN selection process, the UE (100) may find the highest priority PLMN and to attempt to register to the highest priority PLMN. The UE (100) may follow PLMN selection procedures across both 3GPP and 3GPP2 access technologies based on the methods described herein.

Further, the UE (100) may be configured to trigger the manual scan in the interworking mode for acquiring the list of available 3GPP network based PLMNs (e.g., GSM network based PLMNs or the like) in the wireless communication system (4000). In embodiments, the UE (100) may be configured to perform the manual scan in the interworking mode for acquiring the list of available 3GPP network based PLMNs. After triggering the manual scan in the interworking mode, the UE (100) may be configured to display the list of available 3GPP network based PLMNs on the display (150).

Further, the UE (100) may be configured to receive the selection of the PLMN from the displayed list of available 3GPP network based PLMNs by the user of the UE (100). In embodiments, the UE (100) may be configured to receive the selection of the preferred network class (e.g., from the displayed list of available 3GPP network based PLMNs) by the user of the UE (100). Based on the selection(s), the UE (100) may be configured to determine whether the UE (100) is to be registered with the selected PLMN based on one of the user selection of the PLMN and/or a user selected preferred network class PLMN (also referred to herein as a selected network class and/or a preferred network class). In response to determining that the UE (100) is to be registered with the selected PLMN based on the user selection, the UE (100) may be configured to perform the UE selection on the user selected PLMN, or a PLMN equal or similar to the user selected PLMN. In embodiments, the UE (100) determines the PLMN equal or similar to the user selected PLMN with reference to the 3GPP SIM preferred list or the 3GPP2 preferred list, with PLMNs included in a same class, or similar classes, being equal or similar. In response to determining that the UE (100) is to be registered with the selected PLMN based on the user selected preferred network class PLMN, the UE (100) may be configured to perform the UE selection on the user selected preferred network class PLMN, or the PLMN equal or similar to the user selected preferred network class PLMN.

In embodiments, the UE (100) may determine the PLMN to be equal or similar to the user selected preferred network class PLMN with reference to the 3GPP SIM preferred list or the 3GPP2 preferred list, with PLMNs included in the selected network class being equal or similar to the selected network class. Based on the registration result from the GSM PLMN (e.g., the selected PLMN), the UE (100) may be configured to determine whether to attempt registration on the CDMA network of a corresponding GSM PLMN network (e.g., the user selected PLMN) or the network corresponding to the preferred network class selected by the user. In an example, if the 3GPP system does not support voice services (based on registration result) then, the UE (100) may determine to attempt registration on the CDMA network. In embodiments, the UE (100) may be configured to attempt registration with the selected PLMN and, after the UE (100) successfully registers with the selected PLMN, the UE (100) may be configured to perform wireless communication (e.g., transmit and/or receive data) with and/or via the selected PLMN.

Further, the UE (100) may be configured to determine the selected PLMN is a low priority PLMN and start the timer (140) based on the determination. The low priority PLMN may be determined based on a network class and SIM card priority list. In embodiments, the UE (100) may be configured to determine that the selected PLMN is a low priority PLMN with reference to the 3GPP SIM preferred list or a 3GPP2 preferred list, with PLMNs included in at least one of the ANY class and/or the preferred class being low priority PLMNs. In embodiments, the PLMNs included in a network class(es) of lower priority than the selected network class may be low priority PLMNs. Further, the UE (100) may be configured to detect that the timer (140) is expired and scan the high priority system corresponding to the user selected network class based on the timer expiry. The high priority system may be the better system as per MSPL/MLPL configuration. The MSPL/MLPL is discussed further above. If the selected PLMN is not the low priority PLMN then, the UE (100) may attempt to register to the high priority system.

In embodiments, the high priority system may include at least one PLMN of the selected network class. Further, the UE (100) may be configured to determine whether the high priority system is available (e.g., available for registration by the processor (110)) in the wireless communication system based on the scanning. The high priority system may be determined when at least one of the selected network class is received and the selected PLMN is received. In response to determining that the high priority system is available in the wireless communication system, the UE (100) may be configured to attempt to register on the high priority system in the wireless communication system. In response to determining that the high priority system is not available in the wireless communication system, the UE (100) may be configured to restart the timer (140).

Embodiments disclosed herein may be implemented using at least one software program running on at least one hardware device and performing network management functions to control the elements.

According to embodiments, operations described herein as being performed by the UE (100), the processor (110), the communicator (120), the timer (140), the interworking mode detection engine (110*a*), the manual scan triggering engine (110*b*), the PLMN selection and registration engine (110*c*) and/or the high priority system scanning engine (110*d*) may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of embodiments will so fully reveal the general nature of the same that others can, by applying current knowledge, readily modify and/or adapt for various applications such embodiments without departing from the generic concept thereof, and, therefore, such adaptations and modifications should and are intended to be comprehended within the meaning and range of equivalents of embodiments. It is to be understood that the phraseology or terminology employed herein is for the purpose of description and not of limitation. Therefore, while embodiments herein have been described in terms of examples thereof, those skilled in the art will recognize that embodiments herein can be practiced with modification within the spirit and scope of embodiments as described herein.

We claim:

1. A method for selecting a Public Land Mobile Network (PLMN) in a wireless communication system by a User Equipment (UE), the method comprising:

detecting, by the UE, that the UE is operating in an interworking mode;
triggering, by the UE, a manual scan in the interworking mode for acquiring a list of PLMNs in the wireless communication system;
causing, by the UE, a display to output the list of PLMNs in response to the triggering;
receiving, by the UE, a first selection of at least one PLMN among the list of PLMNs from an external source or a second selection of a selected network class from the external source;
registering the UE with a selected PLMN among the list of PLMNs based on the first selection or the second selection;
scanning, by the UE, a high priority system in response to expiration of a timer, the high priority system having a higher priority than the selected PLMN;
determining, by the UE, whether the high priority system is available based on the scanning; and
performing, by the UE, one of
attempting to register on the high priority system in response to determining the high priority system is available, or
restarting the timer in response to determining the high priority system is not available.

2. The method as claimed in claim 1, wherein
the selected PLMN is one of
included in the at least one PLMN based on the receiving including receiving the first selection,
a PLMN equal to the at least one PLMN based on the receiving including receiving the first selection,
included in the selected network class based on the receiving including receiving the second selection, or
a PLMN equal to the selected network class based on the receiving including receiving the second selection; and
the method further comprises determining, by the UE, whether to attempt registration on a Code Division Multiple Access (CDMA) network corresponding to the at least one PLMN or a CDMA network corresponding to the selected network class based on a registration result from the selected PLMN.

3. The method as claimed in claim 1, further comprising:
determining, by the UE, that the selected PLMN is a low priority PLMN;
starting, by the UE, the timer based on the determining the selected PLMN is the low priority PLMN; and
detecting, by the UE, that the timer is expired.

4. The method as claimed in claim 1, wherein the interworking mode is a 3$^{rd}$ Generation Partnership Project (3GPP) and 3GPP2 interworking mode.

5. The method as claimed in claim 1, wherein each PLMN in the list of PLMNs corresponds to a Global System for Mobile (GSM) network-based PLMN.

6. The method as claimed in claim 1, further comprising:
determining the high priority system is determined based on the receiving the first selection or the second selection.

7. The method as claimed in claim 3, further comprising:
determining the low priority PLMN based on the selected network class and a SIM card priority list.

8. The method as claimed in claim 1, wherein the detecting that the UE is operating in the interworking mode is based on a usage of a SIM card.

9. The method as claimed in claim 1, further comprising:
registering the UE with the selected PLMN among the list of PLMNs.

10. The method as claimed in claim 9, further comprising:
performing wireless communication with the selected PLMN based on the registering.

11. An User Equipment (UE) for selecting a Public Land Mobile Network (PLMN) in a wireless communication system, the UE comprising:
a display; and
a processor configured to
detect that the UE is operating in an interworking mode,
trigger a manual scan in the interworking mode for acquiring a list of PLMNs in the wireless communication system,
cause the display to output the list of PLMNs in response to triggering the manual scan,
receive a first selection of at least one PLMN among the list of PLMNs from an external source or a second selection of a selected network class from the external source,
register the UE with a selected PLMN among the list of PLMNs based on the first selection or the second selection,
scan a high priority system in response to expiration of a timer, the high priority system having a higher priority than the selected PLMN,
determine whether the high priority system is available based on the scan of the high priority system, and
perform one of
attempt to register on the high priority system in response to determining the high priority system is available, or
restart the timer in response to determining the high priority system is not available.

12. The UE as claimed in claim 11, wherein
the selected PLMN is one of
included in the at least one PLMN based on receiving the first selection,
a PLMN equal to the at least one PLMN based on receiving the first selection,
included in the selected network class based on receiving the second selection, or
a PLMN equal to the selected network class based on receiving the second selection; and
the processor is configured to determine whether to attempt registration on a Code Division Multiple Access (CDMA) network corresponding to the at least one PLMN or a CDMA network corresponding to the selected network class based on a registration result from the selected PLMN.

13. The UE as claimed in claim 11, wherein the processor is configured to:
determine that the selected PLMN is a low priority PLMN;
start the timer based on determining the selected PLMN is the low priority PLMN;
detect that the timer is expired.

14. The UE as claimed in claim 11, wherein the interworking mode is a 3rd Generation Partnership Project (3GPP) and 3GPP2 interworking mode.

15. The UE as claimed in claim 11, wherein each PLMN in the list of PLMNs corresponds to a Global System for Mobile (GSM) network-based PLMN.

16. The UE as claimed in claim 11, wherein the processor is configured to determine the high priority system based on receiving the first selection or the second selection.

17. The UE as claimed in claim 13, wherein the processor is configured to determine the low priority PLMN based on the selected network class and a SIM card priority list.

18. The UE as claimed in claim 11, wherein the processor is configured to detect that the UE is operating in the interworking mode based on a usage of a SIM card.

19. The UE as claimed in claim 11, wherein the processor is configured to register the UE with the selected PLMN among the list of PLMNs.

20. A non-transitory computer-readable medium storing instructions that, when executed by processing circuitry, cause the processing circuitry to perform a method for selecting a Public Land Mobile Network (PLMN) in a wireless communication system by a User Equipment (UE), the method comprising:
- detecting, by the UE, that the UE is operating in an interworking mode;
- triggering, by the UE, a manual scan in the interworking mode for acquiring a list of PLMNs in the wireless communication system;
- causing, by the UE, a display to output the list of PLMNs in response to the triggering;
- receiving, by the UE, a first selection of at least one PLMN among the list of PLMNs from an external source or a second selection of a selected network class from the external source;
- registering the UE with a selected PLMN among the list of PLMNs based on the first selection or the second selection;
- scanning, by the UE, a high priority system in response to expiration of a timer, the high priority system having a higher priority than the selected PLMN;
- determining, by the UE, whether the high priority system is available based on the scanning; and
- performing, by the UE, one of
  - attempting to register on the high priority system in response to determining the high priority system is available, or
  - restarting the timer in response to determining the high priority system is not available.

* * * * *